United States Patent Office 3,449,013
Patented June 10, 1969

3,449,013
APPARATUS FOR HYDRAULICALLY TRANSPORTING GRANULAR SOLID MATERIAL
Masakatsu Sakamoto and Hidehiko Seki, Tokyo, Japan, assignors to Hitachi, Ltd., Tokyo, Japan, a corporation of Japan
Filed Feb. 19, 1968, Ser. No. 706,307
Claims priority, application Japan, Mar. 3, 1967, 42/13,084; Apr. 7, 1967, 42/21,827; Apr. 12, 1967, 42/30,055; Apr. 24, 1967, 42/25,821
Int. Cl. B65g 53/30
U.S. Cl. 302—14                 14 Claims

ABSTRACT OF THE DISCLOSURE

There is disclosed an apparatus for hydraulically transporting granular solid material with high head, wherein improvements reside in that the valves in pipe lines are always closed in clear water without lowering transport efficiency, that the valves are less liable to bite the solid material if they are closed in the solid-water mixture, that the valves are automatically closed to guarantee the safety of the apparatus when oil-hydraulic pressure actuating the valves has disappeared, that the valves are firmly closed to prevent leakage but are opened with a little force and with little wear, and that the solid-water mixture has very high solid concentration.

---

This invention relates to an apparatus for hydraulically transporting granular solid material, and more particularly an apparatus for hydraulically transporting relatively large sized granular solid material with high lifting head.

There is known an apparatus for hydraulically transporting granular solid material, wherein the apparatus is composed of a plurality of main feed pipes, plate valves provided at the main feed pipes, a low-pressure mixture pump for charging a mixture of water and granular solid material into the main feed pipes, and a high-pressure clear water pump for discharging the mixture out of the main feed pipes toward a transport pipe. However, the conventional apparatus of the kind has several disadvantages, that are:

(1) After the discharge of the main feed pipes, the solid material remains therein, which is bitten by the plate valves, thereby causing not only the damage of valve plates and seats of the plate valves but also incomplete closing of the plate valves.

(2) Since the solid material remaining in the main feed pipes after the discharge thereof is returned to a mixing tank of the material via return water pipes, the transport efficiency is lowered.

(3) It is difficult to operate the apparatus with a mixture of more than 20 percent concentration in true volume when the solid material is relatively large-sized granules having diameters of more than 2 mm.

(4) A rod for operating the valve plate of the plate valve is subjected to a bending moment and is apt to be broken. In addition, since the valve plate is strongly urged against the valve seat when the valve is closed due to large pressure difference, it requires a relatively large force to open the valve, and there is a danger of damaging the sliding portions of the valve plate and seat.

Accordingly, the main object of the present invention is to remove the above-mentioned disadvantages and to provide an improved and efficient apparatus for hydraulically transporting granular solid material.

Another object of the present invention is to provide an apparatus for hydraulically transporting granular solid material, wherein no solid material remains in the main feed pipes owing to a design based upon researches on the performance of the solid-water mixture so that the valves are infallibly closed in clear water, and no solid material escapes to the return water pipe.

Still another object is to provide an improved mixing apparatus for the solid material and water, which can supply the solid-water mixture of such a high concentration in true volume as about 40 percent when it is delivered from the low-pressure mixture pump so that the concentration in true volume in the transport pipe can be so high as to be more than 20 percent in spite of the dilution in the main feed pipes.

Still other object is to provide a valve which is most suitable for use with an apparatus of the present invention in order to attain safe and reliable transport of the solid material with less liability to wear and breakage.

According to the present invention, there is provided an apparatus for hydraulically transporting granular solid material comprising a plurality of parallel main feed pipes, return water pipes, each being connected to said main feed pipe, a mixing tank for mixing the solid material and water, a low-pressure mixture pump for charging the solid-water mixture from said mixing tank into said main feed pipes, a high-pressure clear water pump for discharging the mixture out of said main feed pipes toward a transport pipe, and valves provided in the respective pipe lines, characterized by the fact that the mean flow velocity of the mixture in said main feed pipes when it is charged by said low-pressure mixture pump is lower than the flow velocity of the solid material at the trailing end of the mixture in said main feed pipes when it is discharged by the clear water delivered by said high-pressure clear water pump.

According to another aspect of the present invention, the length of the main feed pipe is determined to be equal to the distance which the solid material at the leading end of the mixture covers during the period when it is charged into the main feed pipe.

According to still other aspect of the present invention, the solid-water mixture having a high solid concentration in true volume is produced by a mixing apparatus comprising an auxiliary feed pipe fluidly connected to the bottom of the mixing tank via variable opening, the upstream end of the auxiliary feed pipe being fluidly connected to the bottom of a clear water tank, the water level in which is kept lower than that in the mixing tank.

According to still other aspect of the present invention, there is provided a plate valve which is closed by a valve plate having a through opening adjacent its end where a valve operating rod is connected being drawn by said valve operating rod, whereby it is advantageously avoided that the solid material is bitten by the valve plate and seat in case of closing thereof and it is secured that the valve is automatically closed when an oil-hydraulic system comprising said valve operating rod has come to stoppage.

Figure 1:
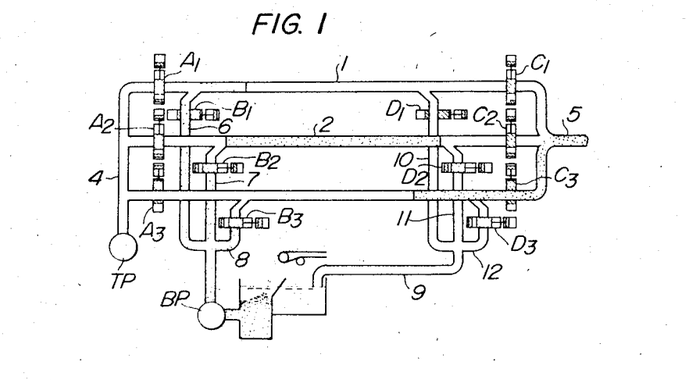
FIG. 1 is a diagrammatic illustration of an apparatus for hydraulically transporting granular solid material according to the present invention.

Referring to FIG. 1, the apparatus for hydraulically transporting granular solid material has three parallelly arranged main feed pipes 1, 2 and 3. Each of the main feed pipes can be supplied from one end thereof with clear water by a high-pressure clear water pump TP via a clear water pipe 4 and a plate valve $A_1$, $A_2$ or $A_3$, or with the solid-water mixture by a low-pressure mixture pump BP via a mixture pipe 6, 7 or 8 and a plate valve $B_1$, $B_2$ or $B_3$. The opposite or discharge end of each main feed pipe is connected to a transport pipe 5 via a plate valve $C_1$, $C_2$ or $C_3$. From a near upstream portion of each plate valve $C_1$, $C_2$ or $C_3$, each main feed pipe is branched by a return water pipe 10, 11 or 12, which is led to a supply water tank via a common return water pipe 9.

In operation, the plate valves $A_1$–$A_3$ and $C_1$–$C_3$ are first closed, and the plate valves $B_1$–$B_3$ and $D_1$–$D_3$ are opened. Then the solid-water mixture, being pumped by the low-pressure mixture pump BP, is charged into the main feed pipes 1–3. Just at the time when the main feed pipes have been filled with the mixture, the plate valves $B_1$–$B_3$ and $D_1$–$D_3$ are closed, and thereafter the plate valves $A_1$–$A_3$ and $C_1$–$C_3$ are opened, whereby the mixture charged in the main feed pipe is discharged therefrom toward the transport pipe by high-pressure clear water pumped by the high-pressure clear water pump TP.

Figure 2:
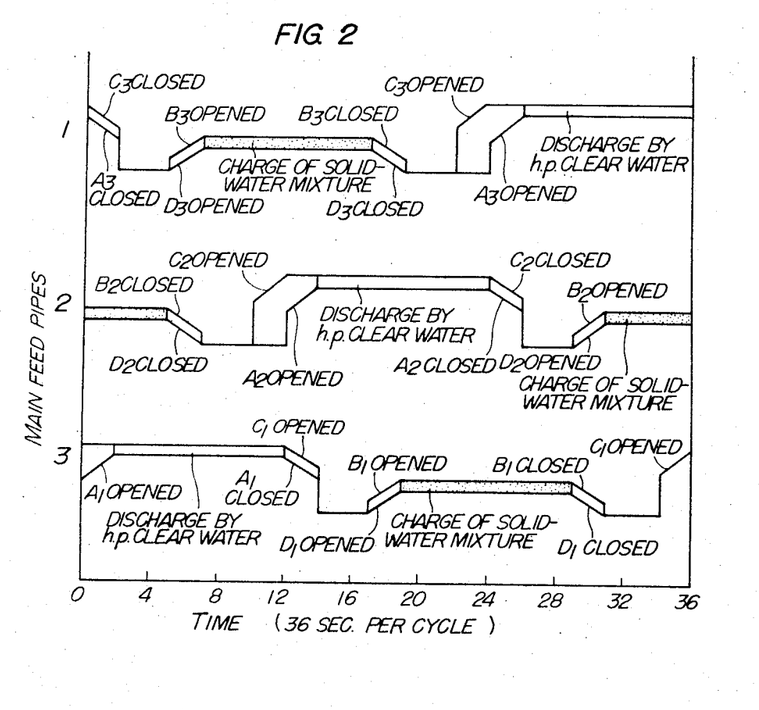
FIG. 2 is an illustrative diagram of an example of opening and closing cycles of respective plate valves provided in the main feed pipes of the present invention.

Each main feed pipe can, of couse, be operated independently of the other two main feed pipes. By effecting the opening and closing of the plate valves of the main feed pipes 1, 2 and 3 with a time cycle as shown, for example, in FIG. 2, the above-mentioned operation is successively repeated in the main feed pipes 1, 2 and 3, whereby the transport of the solid material can be performed continuously during the continuous operation of the high-pressure clear water pump TP and the low-pressure mixture pump BP.

Now, one of the most important problems to be considered in hydraulically transporting granular solid material is that the flow velocity of the solid material at the trailing end of the solid-water mixture is relatively lower than the mean flow velocity of the mixture.

Figure 3:
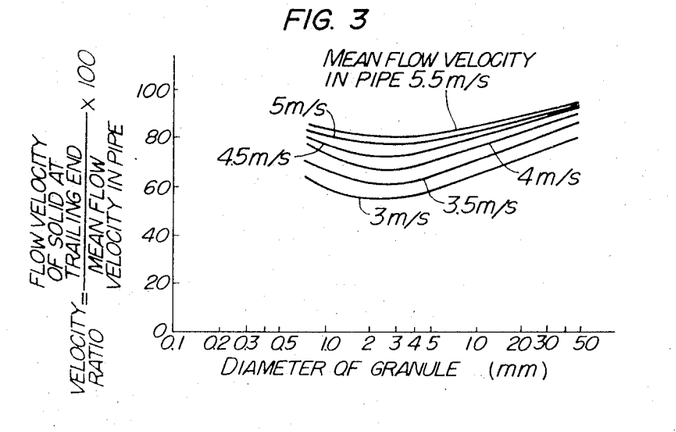
FIG. 3 is a diagram showing the relation between the diameter of the solid granule and the velocity ratio (ratio of the flow velocity of the solid material at the trailing end of the mixture to the mean flow velocity of the mixture in a pipe)

FIG. 3 shows some test results on the relation between the diameter of the granular solid material and the velocity ratio of the flow velocity of the solid material at the trailing end of the mixture to the mean flow velocity of the mixture, with a condition that the mixture of 20 percent concentration in true volume is charged into a pipe 105 mm. diameter and 2 m. length. From these results, one can know the following facts:

(1) The extent of the delay of the solid material at the trailing end of the mixture changes with the diameter of the granules of the solid material and is the largest when the diameter is about 3 mm.

(2) In case of the granules of about 3 mm. diameter, the ratio of the flow velocity of the solid material at the trailing end of the mixture to the mean flow velocity of the mixture is little higher than 0.8 even when the mean velocity is relatively high.

Accordingly, if the volume of flow $Q_L$ of the mixture delivered by the low-pressure mixture pump BP during a period of cycle is nearly equal to the volume of flow $Q_H$ of clear water delivered by the high-pressure clear water pump TP during a period of cycle, the solid material unavoidably remains within the main feed pipe, causing the following troubles:

(1) When the plate valves, especially the plate valves $C_1$–$C_3$ are closed, the solid material will be bitten by the valve plates and seats, thereby probably causing damage thereof.

(2) Since the remaining solid material is returned via the return water pipe, the transport efficiency is lowered.

In addition, if the length L of the main feed pipe is not proper, the following disadvantages will be brought about:

(1) If the length L of the main feed pipe is too short, the leading end of the mixture, while it is charged into the main feed pipe, escapes into the return water pipe and is returned therethrough.

(2) If the length L of the main feed pipe is too long, a longer dead space is left between the leading end of the charged mixture and the plate valves $C_1$–$C_3$.

The above-mentioned troubles and disadvantages are avoided in the apparatus according to the present invention by determining the volumes and velocities of flows of the mixture and clear water, the length of the main feed pipe and the time of opening and closing of the plate valves in such a relation that the conditions $$\frac{Q_L}{Q_H} < \frac{V_1}{V_2}$$

and $$L \cong V_{L1} \cdot T$$

are always satisfied; wherein $Q_L$ is volume of flow of the solid-water mixture delivered by the low-pressure mixture pump BP during a period of cycle;

$V_H$ is volume of flow of clear water delivered by the high-pressure pump TP during a period of cycle;

$V_1$ is flow velocity of the solid material at the trailing end of the mixture when it is discharged out of the main feed pipe;

$V_2$ is mean flow velocity of the mixture when it is discharged out of the main feed pipe;

L is length of the main feed pipe;

$V_{L1}$ is flow velocity of the solid material at the leading end of the mixture when it is charged into the main feed pipe; and T is the time during which the plate valves $B_1$–$B_3$ and $D_1$–$D_3$ are opened.

The first condition $$\frac{Q_L}{Q_H} < \frac{V_1}{V_2}$$

will now be explained in detail with reference to FIG. 4. Assuming that the main feed pipe is filled with the mixture and then the plate valves A and C are opened. If $Q_H$ is equal to $Q_L$, the solid material at the trailing end of the mixture is finally transferred from point $e$ to point $i$, the distance $L'$ of the transfer being little longer than 80 percent of the full length L of the main feed pipe extending from point $e$ to point $f$. This means that some solid material remains in the main feed pipe from point $i$ toward downstream, that the plate valve C will bite the solid material when it is closed, and that the solid material remaining between points $i$ and $f$ escapes and is returned via the plate valve D and the return water pipe when the plate valves B and D are opened in succession. To avoid these disadvantages, the solid material at the trailing end of the mixture must cover a distance $L + \Delta L$ during a period $T'$ during which the plate valves A and C are opened. Thus an inequality $$V_1 > \frac{L + \Delta L}{T'} \tag{1}$$

must be satisfied. By rewriting the inequality (1) as $$1 > \frac{1}{V_1} \left( \frac{L + \Delta L}{T'} \right)$$

and multiplying both sides by $V_2$, we can obtain $$V_2 > \frac{V_2}{V_1}\left(\frac{L+\Delta L}{T'}\right)$$

$\Delta L$ may be a very small valve as compared with L and will be neglected for simplicity. Thus we can obtain an inequality $$V_2 > \frac{V_2}{V_1} \cdot \frac{L}{T'} \qquad (2)$$

On the other hand, if the product of the time T during which the plate valves B and D are open and the mean flow velocity $V_L$ of the mixture when it is charged into the main feed pipe or the distance covered by the mixture of volume $Q_L$ is longer than the length L of the main feed pipe, said escaping of the mixture through the plate valve D will occur. Accordingly, an inequality $L > V_L \cdot T$, or $$\frac{L}{T} > V_L \qquad (3)$$

must be satisfied. For the simplicity of operation, if the times T and T' are assumed to be equal, the inequality (3) can be substituted in the inequality (2), whereby an inequality $$V_2 > \frac{V_2}{V_1} \cdot V_L \qquad (4)$$

is obtained. If the cross sectional area of the main feed pipe is expressed by A, there exist equations $$V_2 = \frac{Q_H}{AT}$$

and $$V_L = \frac{Q_L}{AT}$$

By substituting these equations in the inequality (4), $$Q_H > \frac{V_2}{V_1} \cdot Q_L \text{ or } \frac{Q_L}{Q_H} < \frac{V_1}{V_2}$$

is obtained. From the inequality (4), an inequality $V_1 > V_L$ is also obtained. This means that the mean flow velocity of the mixture when it is charged into the main feed pipe must be lower than the flow velocity of the solid material at the trailing end of the mixture when it is discharged out of the main feed pipe. If it should be highly ascertained that the plate valve C never bite the solid material, the point $i$ may be displaced to the downstream of the plate valve C, provided that the condition $$\frac{Q_L}{Q_H} < \frac{V_1}{V_2}$$

is kept as well.

The second condition $L \cong V_{L1} \cdot T$ is necessary to prevent the escaping of the solid material via the plate valve D when it is charged into the main feed pipe or the too much space being left uncharged at the upstream portion of the plate valve D, because otherwise the transport efficiency will be lowered to that extent.

Summarizing, if the first condition $$\frac{Q_L}{Q_H} < \frac{V_1}{V_2}$$

is satisfied, there remains no solid material in the main feed pipes after it was discharged therefrom by clear water, and thereby the damage of the plate valves due to their biting of the solid material will be avoided. At the same time it is avoided that the solid material in excess of the capacity of the main feed pipe be returned via the plate valve $D_1$, $D_2$ or $D_3$. If the second condition $L \cong V_{L1} \cdot T$ is satisfied, the charging of the solid material in the main feed pipe is performed in full but not exceeding condition, thus enabling the most economical operation of the apparatus.

Figures 4, 5:
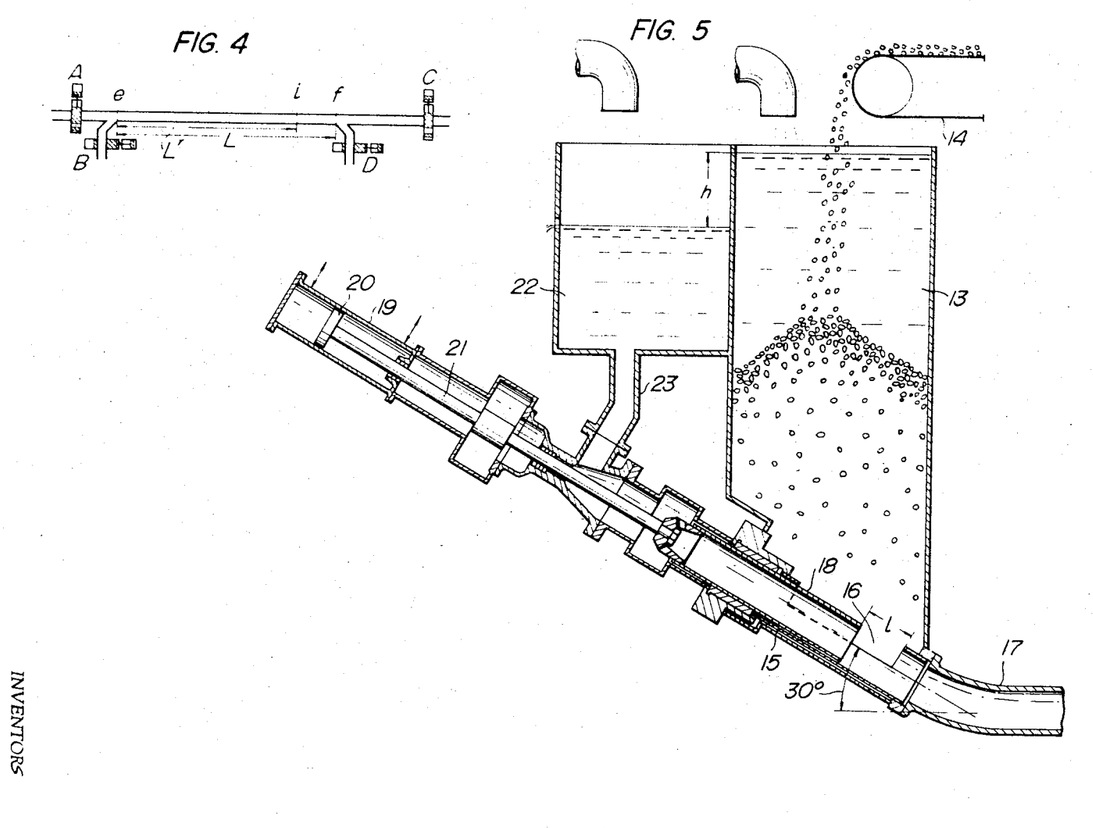
FIG. 4 is an illustrative drawing for the purpose of explaining a condition required for an apparatus of the present invention.
FIG. 5 is a longitudinally sectional view of a mixing apparatus according to the present invention for delivering the solid-water mixture.

In FIG. 5, there is shown an embodiment of the mixing apparatus according to the present invention, which can supply the low-pressure mixture pump BP with the solid-water mixture of a high concentration in true volume much higher than 20 percent. The mixing apparatus includes a mixing tank 13 which is supplied with the granular solid material by a feeder 14 and water. Through the bottom of the tank 13, there extends an auxiliary feed pipe 15 with an inclination of about, for example, 30 degrees with respect to the level. The lower end of the pipe 15 disposed in the tank 13 is provided with an opening 16 opened to the inside of the tank, and is connected to a mixture pipe 17 leading to the suction of the low-pressure mixture pump BP. The opening 16 can be variably closed by a sliding valve 18, the movement of which is controlled by a rod 21 having a piston 20 slidably mounted within an oil-hydraulic cylinder 19. The upstream end of the auxiliary feed pipe 15 is fluidly connected with a clear water tank 22 via a conduit 23. The clear water tank 22 is provided with an overflow port so that the water level therein is always kept lower than that in the mixing tank 13 by a head $h$.

Figure 6:
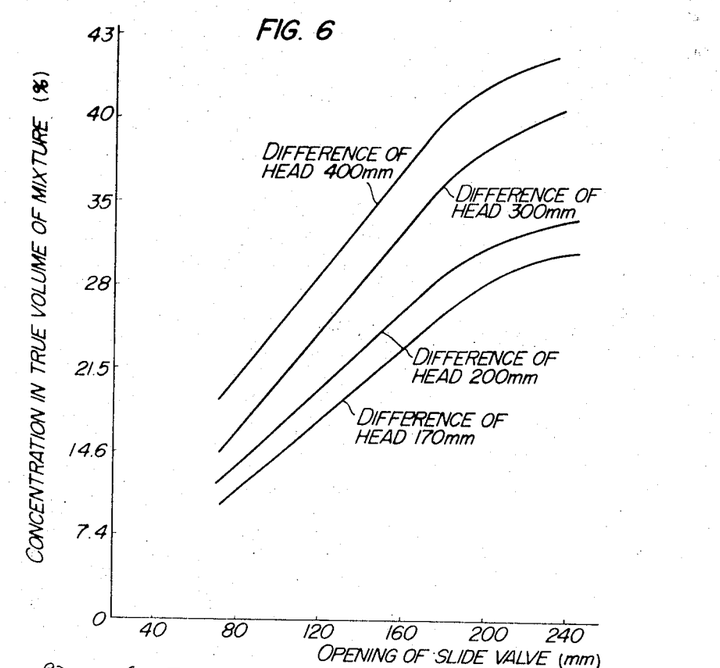
FIG. 6 is a diagram showing the relation between the valve opening and the concentration in true volume of the mixture obtained by the mixing apparatus shown in FIG. 5.

FIG. 6 shows some test results on the concentration in true volume of the solid-water mixture delivered by the mixing apparatus shown in FIG. 5 in relation to the opening $l$ of the sliding valve 18 and the head $h$ between the water levels in the tanks 13 and 22. In conventional apparatuses for hydraulically transporting granular solid material, it was very difficult to deliver a solid-water mixture of more than 20 percent concentration in true volume when it deals with relatively large-sized granules of more than 2 mm. diameter. However, the mixing apparatus as shown in FIG. 5 can deliver the solid-water mixture of such a high concentration in true volume as, for example, about 40 percent when the difference of the water level $h$ is 300 mm. and the opening $l$ of the sliding valve 18 is 230 mm. Thus, it will be appreciated that substantially improved efficiency and economy of transport can be attained by the apparatus according to the present invention.

Considerations will now be given to the valves incorporated in the apparatus for hydraulically transporting granular solid material of the present invention. Troubles of the valves were the most frequent one with the apparatuses of the kind, because the valves are opened and closed with so many repetitions that their valve bodies and seats are subjected to severe wearing, especially when the granular solid material of large size is dealt with. If the valve body and seat have been worn, there occurs leakage of water across the valve, thereby lowering the transport efficiency. Furthermore, if the wear becomes serious, there is a danger that the low-pressure mixture pump is exposed to the high pressure due to the high-pressure clear water pump and is damaged.

In order to obtain a valve which is less liable to wear and damage, experimental researches were performed on several types of valves. At first, a typical cone valve having a cone valve body and a complementally corresponding cone seat was examined. As the results, it was found that this valve is very liable to bite large lumps and to be damaged due to stress concentration caused by the lumps. Secondly a cylinder valve of the kind that a flat disk is approached to a cylindrical valve seat in order to close the valve was examined. As the results, it was found that this valve is also liable to bite large lumps and to be damaged as the case of the cone valve.

In contrast with the above two valves, it was found that a plate valve having a flat valve body or plate slidingly moved in contact with a flat valve seat can be closed certainly by shearing large lumps if they are in the way with no observable stress concentration.

However, the plate valve of the conventional type was not free from damage to such an extent as to be satisfactorily used for the present purpose. As the results of inquiry into causes for the inexpendiency, it was found that there is a problem in the fact that the conventional plate valve is closed when the valve plate is moved downward. This will be explained with reference to FIG. 7.

Figure 7:
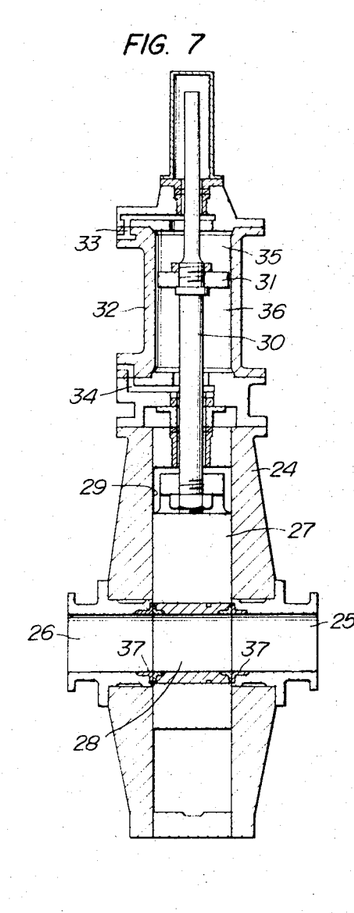
FIG. 7 is a schematic axial section of a conventional plate valve.

FIG. 7 shows a conventional plate valve having a valve housing 24 provided with an inlet port 26 and an outlet port 25. Within the housing there is slidably mounted a valve plate 27 to follow in contact along guide planes 29 and valve seats 37, wherein the valve plate is provided with a through opening 28 at the lower portion thereof so that the valve is closed when the valve plate is moved downward. At the upper end thereof the valve plate 27 is connected with a valve operating rod 30, on which is mounted a piston 31 cooperating with an oil-hydraulic cylinder 32. The cylinder 32 is supplied with pressure oil through ports 33 and 34.

If an upper chamber 35 in the cylinder 32 is supplied with oil, the piston 31 is urged downward with the rod 30, whereby the valve plate 27 is moved downward along the guide planes 29 and the valve seats 37 to isolate the inlet and outlet ports 26 and 25. Conversely, if a lower chamber 36 in the cylinder 32 is supplied with oil, the valve plate 27 is moved upward to connect the inlet and outlet ports 26 and 25 via the through opening 28. Due to such mode of operation of the conventional plate valve that the bottom portions of the valve seats are traversed, at the last stage of closing, by the top portion of the through opening of the lowering valve plate, it is very likely that the lumps of the solid material are bitten by the valve plate 27 and the valve seats 37, thereby damaging these portions. Furthermore, if the oil pressure system operating the piston 31 has come to stoppage and the oil pressure has disappeared due to the operator's will or any accidental cause, the water pressure residing in the high pressure transport system is transmitted through narrow clearances between the valve plate and seats to the spaces above and below the valve plate 27. In this occasion, since the effective area exposed to the hydraulic pressure of the lower end of the valve plate is larger than that of the upper end of the valve plate by the sectional area of the rod 30, a resultant upward force is exerted on the valve plate 27, hereby the valve plate is moved upward to connect the inlet and outlet ports 26 and 25 via the through opening 28, or to open the valve. This fact is very dangerous in the view point of safety of the apparatus.

As to the plate valve for use with a high pressure system such as the high head solid transport system of the present invention, there are other problems to be solved, i.e., (1) If, for example, the valve plate $A_1$ is closed, the high pressure due to the high pressure clear water pump TP is applied on the upstream side of the plate valve $A_1$, whereby the valve plate 27 is biased toward the downstream side. If in this occasion the valve plate 27 is rigidly connected with the rod 30, the latter will be subjected to a bending stress due to the clearance between the valve plate and the valve seats. By being subjected to the bending stress repeatedly, there will probably be a danger of fatigue failure of the rod 30.

(2) Since the valve plate 27 is strongly urged against the valve seat 37 by the high pressure, it requires a large force to open the valve, and therefore, the sliding portions of the valve plate and seat are damaged as much.

Figure 8:
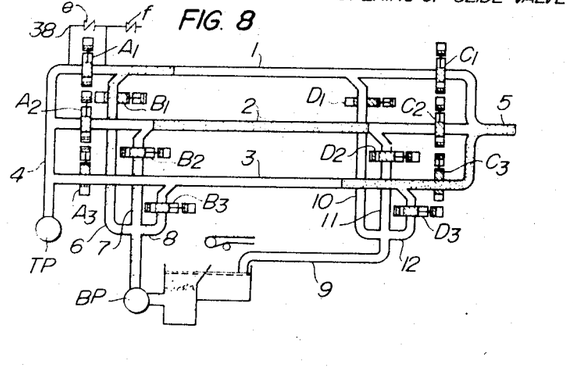
FIG. 8 is an illustrative diagram of an apparatus according to the present invention, incorporating a device for lowering wear of the plate valves.
Figure 9:
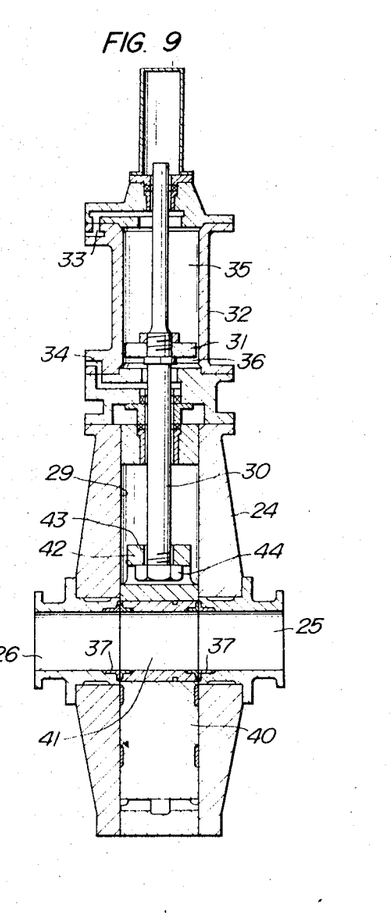
FIG. 9 is a schematic axial section of an improved plate valve according to the present invention.

FIGS. 8 and 9 show an embodiment of an apparatus for hydraulically transporting granular solid material and a plate valve to be incorporated therein, respectively, whereby the above-mentioned disadvantages are removed. In FIG. 8, the same parts as those in FIG. 1 are indicated by the same numerals. Also in FIG. 9, the same parts as those in FIG. 7 are indicated by the same numerals. In the apparatus shown in FIG. 8, a pressure equalizing valve $e$ and a pressure relief valve $f$ are provided so that the valve $e$ can by-pass the plate valve $A_1$ via a bypass line 38. On the other hand, in the plate valve shown in FIG. 9, the connection between the rod 30 and the valve plate 40 is so constituted by a yoke 42 having an opening 43 of a larger diameter than that of the rod 30 which is passed therethrough and a nut 44 threaded onto the end of the rod 30 that there is left a lateral clearance between the rod and the valve plates so as to allow a relative displacement thereof and not to cause the above-mentioned bending stress. In operation, if the pressure relief valve $f$ is opened while the plate valve $A_1$ has been closed to charge the main feed pipe 1 with the solid-water mixture, the high pressure which was residing in the main feed pipe is relieved, and therefore, the valve plate 40 is strongly urged against one side of the valve seats, firmly closing the outlet port 25. Since the valve plate 40 can be laterally shifted with respect to the rod 30 as described in the above, no bending stress is caused in the rod 30. When the plate valve $A_1$ is to be opened thereafter, the pressure equalizing valve $e$ is first opened, whereby the pressure in the main feed pipe 1 is raised to equalize the pressure on both sides of the valve plate 40. Then, the force urging the valve plate against the valve seat disappears and the valve plate can be moved easily with a little force and with little wearing. Although there is shown in FIG. 8 a set of the pressure equalizing and relieving means 38, $e$ and $f$ for the main feed pipe 1 for simplicity, the main feed pipes 2 and 3 may of course be provided with the same means. Furthermore, the valves $e$ and $f$ may be replaced by a three-way valve.

Another important feature of the plate valve shown in FIG. 9 will now be explained. In this plate valve, the valve plate 40 slidably mounted within the housing 24 has a through opening 41 at the upper portion thereof so that it opens the valve when it is moved downward and closes the valve when it is moved upward. When this plate valve is being closed or the valve plate is moving upward, lumps of the solid material lying on or near the border of the through opening 41 and the bottom edges of the valve seats 37 are lifted and are shed out before the valve is finally closed between the top edges of the valve seats 37 and the bottom edges of the through opening 41. Accordingly, there is no danger of biting lumps of the solid material in case of the plate valve of the present invention.

Furthermore, if the oil pressure acting on the piston 31 has disappeared, the high pressure water leaking out through the clearances between the valve plate and the valve seats urges the valve plate upward to automatically close the valve. Therefore, dangers and troubles due to unexpected opening of the valves are eliminated.

Summarizing, according to the present invention, the apparatus for hydraulically transporting granular solid material has the following remarkable advantages:

(1) No solid material remains in the main feed pipes after the discharge period thereof and no solid material escapes into the return water pipes during the period of charging the solid-water mixture into the main feed pipes, whereby the plate valves $C_1$–$C_3$ and $D_1$–$D_3$ are always closed in clear water and the maximum transport efficiency can be obtained.

(2) Since the solid-water mixture having such a high concentration in true volume as up to about 40 percent is available, transport of the solid material can be very economically performed.

(3) The valve plate and seat are less liable to wear and damage, and the valve guarantees high degree of safety since it is automatically closed when the oil-hydraulic pressure actuating the valve operating piston has disappeared.

(4) Since the valve operating rod is free from any bending stress, there is no danger of breakage thereof. Furthermore, the valve can be opened with a little force and with little wear by equalizing the pressure acting on the both sides of the valve plate.

Although the present invention has been described with reference to a particular example, it is to be understood

We claim:

1. An apparatus for hydraulically transporting granular solid material comprising a plurality of parallel main feed pipes, return water pipes, each being connected to said main feed pipe, a mixing tank for mixing the solid material and water, a low-pressure mixture pump for charging the solid-water mixture from said mixing tank into said main feed pipes, a high-pressure clear water pump for discharging the mixture out of said main feed pipes toward a transport pipe, and valves provided in the respective pipe lines, characterized by the fact that the mean flow velocity of the mixture in said main feed pipes when it is charged by said low-pressure mixture pump is lower than the flow velocity of the solid material at the trailing end of the mixture in said main feed pipes when it is discharged by the clear water delivered by said high-pressure clear water pump.

2. An apparatus for hydraulically transporting granular solid material comprising a plurality of parallel main feed pipes, return water pipes, each being connected to said main feed pipe, a mixing tank for mixing the solid material and water, a low-pressure mixture pump for charging the solid-water mixture from said mixing tank into said main feed pipes, a high-pressure clear water pump for discharging the mixture out of said main feed pipes toward a transport pipe, and valves provided in the respective pipe lines, characterized by the fact that volume of flow $Q_L$ of the mixture delivered by the low-pressure mixture pump during a period of cycle, volume of flow $Q_H$ of clear water delivered by the high-pressure pump during a period of cycle, flow velocity $V_1$ of the solid material at the trailing end of the mixture when it is discharged out of the main feed pipe, and mean flow velocity $V_2$ of the mixture when it is discharged out of the main feed pipe are so determined that a condition $$\frac{Q_L}{Q_H} < \frac{V_1}{V_2}$$

is satisfied.

3. An apparatus for hydraulically transporting granular solid material comprising a plurality of parallel main feed pipes, return water pipes, each being connected to said main feed pipe, a mixing tank for mixing the solid material and water, a low-pressure mixture pump for charging the solid-water mixture from said mixing tank into said main feed pipes, a high-pressure clear water pump for discharging the mixture out of said main feed pipes toward a transport pipe, a clear water tank attached to said mixing tank, and valves provided in the respective pipe lines, characterized by the fact that the water level in said clear water tank is kept lower than that in said mixing tank and that an auxiliary feed pipe leading to the suction side of said low-pressure mixing pump is so arranged that it is fluidly connected with the bottoms of said mixing and clear water tanks, the connection between said auxiliary feed pipe and the mixing tank being controlled as to the opening thereof.

4. An apparatus for hydraulically transporting granular solid material comprising a plurality of parallel main feed pipes, return water pipes, each being connected to said main feed pipe, a mixing tank for mixing the solid material and water, a low-pressure mixture pump for charging the solid-water mixture from said mixing tank into said main feed pipes, a high-pressure clear water pump for discharging the mixture out of said main feed pipes toward a transport pipe, and valves provided in the respective pipe lines, characterized by the fact that at least some of said valves are plate valves, each having a valve plate slidingly moved by a valve operating rod along a valve seat provided within a housing, wherein said valve plate is provided with a through opening adjacent its end connected with said valve operating rod so that the valve is closed when said valve plate is drawn by said valve operating rod or is automatically urged toward said rod by a resultant force due to hydraulic pressure acting on both ends thereof.

5. An apparatus for hydraulically transporting granular solid material according to claim 1, wherein the length of said main feed pipe is determined to be substantially equal to the distance covered by the solid material at the leading end of the mixture passing through said main feed pipe during a period of charging the mixture therein.

6. An apparatus for hydraulically transporting granular solid material according to claim 1, wherein said valves are plate valves, each having a valve plate slidingly moved by a valve operating rod along a valve seat provided within a housing, wherein said valve plate is provided with a through opening adjacent its end connected with said valve operating rod so that the valve is closed when said valve plate is drawn by said valve operating rod or is automatically urged toward said rod by a resultant force due to hydraulic pressure acting on both ends thereof.

7. An apparatus for hydraulically transporting granular solid material according to claim 1, wherein said valve provided in a high-pressure clear water pipe extending from said high-pressure clear water pump is provided with a device for equalizing the pressures on both sides thereof.

8. An apparatus for hydraulically transporting granular solid material according to claim 1, wherein said mixing tank is provided with a clear water tank attached thereto, the water level in said clear water tank being kept lower than that in said mixing tank, and an auxiliary feed pipe leading to the suction side of said low-pressure mixing pump is so arranged that it is fluidly connected with the bottoms of said mixing and clear water tanks, the connection between said auxiliary feed pipe and the mixing tank being controlled as to the opening thereof.

9. An apparatus for hydraulically transporting granular solid material according to claim 2, wherein length L of said main feed pipe, flow velocity $V_{L1}$ of the solid material at the leading end of the mixture passing through said main feed pipe when it is charged therein and time T during which said valves provided in a pipe extending from the delivery side of said low-pressure mixture pump to said main feed pipe and in said return water pipe are opened are so determined that a condition $L \cong V_{L1} \cdot T$ is satisfied.

10. An apparatus for hydraulically transporting granular solid material according to claim 3, wherein said auxiliary feed pipe is an inclined tube fluidly connected with said mixing tank via an opening in said pipe, the extent of said opening being controlled by a sliding shut off valve.

11. An apparatus for hydraulically transporting granular solid material according to claim 4, wherein said valve plate is connected with said valve operating rod in such a manner that a laterally relative movement is allowed between them.

12. An apparatus for hydraulically transporting granular solid material according to claim 5, wherein said valves are plate valves, each having a valve plate slidingly moved by a valve operating rod along a valve seat provided within a housing, wherein said valve plate is provided with a through opening adjacent its end connected with said valve operating rod so that the valve is closed when said valve plate is drawn by said valve operating rod or is automatically urged toward said rod by a resultant force due to hydraulic pressure acting on both ends thereof.

13. An apparatus for hydraulically transporting granular solid material according to claim 5, wherein said mixing tank is provided with a clear water tank attached thereto, the water level in said clear water tank being kept lower than that in said mixing tank, and an auxiliary feed pipe leading to the suction side of said low-pressure mixing pump is so arranged that it is fluidly connected with the bottoms of said mixing and clear water tanks, the connection between said auxiliary feed pipe and the mixing tank being controlled as to the opening thereof.

14. An apparatus for hydraulically transporting granular solid material according to claim 12, wherein said mixing tank is provided with a clear water tank attached thereto, the water level in said clear water tank being kept lower than that in said mixing tank, and an auxiliary feed pipe leading to the suction side of said low-pressure mixing pump is so arranged that it is fluidly connected with the bottoms of said mixing and clear water tanks, the connection between said auxiliary feed pipe and the mixing tank being controlled as to the opening thereof.

References Cited

UNITED STATES PATENTS

| | | | |
|---|---|---|---|
| 2,672,370 | 3/1954 | Jones et al. | 302—14 |
| 2,672,371 | 3/1954 | Jones | 302—14 |
| 2,920,923 | 1/1960 | Wasp et al. | 302—66 |
| 3,254,924 | 6/1966 | Harrison et al. | 302—14 |

ANDRES H. NIELSEN, *Primary Examiner.*